US012571723B2

(12) United States Patent
Carras et al.

(10) Patent No.: US 12,571,723 B2
(45) Date of Patent: Mar. 10, 2026

(54) DEVICE FOR MEASURING LASER RADIATION BY PHOTOACOUSTIC EFFECT

(71) Applicant: MIRSENSE, Palaiseau (FR)

(72) Inventors: Mathieu Carras, Saint Nazaire (FR); Guillaume Aoust, Massy (FR)

(73) Assignee: MIRSENSE, Palaiseau (FR)

( * ) Notice: Subject to any disclaimer, the term of this patent is extended or adjusted under 35 U.S.C. 154(b) by 103 days.

(21) Appl. No.: 18/267,441

(22) PCT Filed: Dec. 13, 2021

(86) PCT No.: PCT/EP2021/085448
§ 371 (c)(1),
(2) Date: Jun. 21, 2023

(87) PCT Pub. No.: WO2022/128892
PCT Pub. Date: Jun. 23, 2022

(65) Prior Publication Data
US 2024/0060876 A1 Feb. 22, 2024

(30) Foreign Application Priority Data
Dec. 15, 2020 (FR) ...................................... 2013220

(51) Int. Cl.
G01N 21/17 (2006.01)
(52) U.S. Cl.
CPC . *G01N 21/1702* (2013.01); *G01N 2021/1704* (2013.01); *G01N 2201/0697* (2013.01)
(58) Field of Classification Search
None
See application file for complete search history.

(56) References Cited

U.S. PATENT DOCUMENTS

2006/0123884 A1* 6/2006 Selker ................ G01N 21/1702
73/24.02
2008/0073536 A1 3/2008 Willing et al.
(Continued)

FOREIGN PATENT DOCUMENTS

CN        112 067 557 A        12/2020
DE          35 08 027 A1        9/1986
(Continued)

OTHER PUBLICATIONS

Feiertag, et al., "Flip chip packaging for MEMS microphones", Microsystem Technologies, vol. 16, No. 5, pp. 817-823, 2010.
(Continued)

*Primary Examiner* — Uzma Alam
*Assistant Examiner* — Chad Andrew Reverman
(74) *Attorney, Agent, or Firm* — BakerHostetler

(57) ABSTRACT

A device for measuring the power and wavelength of laser radiation via the photoacoustic effect, includes a cell containing at least one gas having an absorption line with a central wavelength $\lambda_c$, an electro-acoustic transducer arranged within the cell and suitable for generating a signal representative of the photoacoustic signal in the cell, means for processing the signal generated by the electro-acoustic transducer, wherein an estimate of the concentration of the one or more gases is stored, at least one laser source suitable for emitting, into the cell, laser radiation at a wavelength suitable for exciting at least one gas contained in the cell, the laser radiation having a wavelength that is variable in an oscillatory manner about an average wavelength $\lambda_{moy}$ at a modulation frequency ($f_1$), such that an interaction between the laser radiation and at least one gas contained in the cell induces generation of a photoacoustic signal at a detection frequency of the electro-acoustic transducer, the cell being sealed by a membrane so as to be impermeable to the one or (Continued)

more gases contained in the cell and having an optical aperture transparent to the laser radiation, the processing means being configured to determine a variation in the phase $\Phi(t)$ of the photoacoustic signal based on the photoacoustic signal, the processing means being suitable for measuring the wavelength of the radiation based on the photoacoustic signal.

15 Claims, 8 Drawing Sheets

(56) References Cited

U.S. PATENT DOCUMENTS

| | | | |
|---|---|---|---|
| 2020/0033255 A1 * | 1/2020 | Chen | G01S 7/497 |
| 2025/0060307 A1 * | 2/2025 | Brown | G01J 3/42 |

FOREIGN PATENT DOCUMENTS

| | | | |
|---|---|---|---|
| EP | 2 392 916 A2 | 12/2011 | |
| JP | S59-94027 A | 5/1984 | |
| JP | H11-146475 A | 5/1999 | |
| JP | 2008-83049 A | 4/2008 | |
| WO | WO-2004008113 A1 * | 1/2004 | G01N 21/1702 |

OTHER PUBLICATIONS

Saarela, et al., "Wavelength modulation waveforms in laser photoacoustic spectroscopy", Applied Optics, vol. 48, Issue 4, pp. 743-747, 2009.

* cited by examiner

DEVICE FOR MEASURING LASER RADIATION BY PHOTOACOUSTIC EFFECT

CROSS-REFERENCE TO RELATED APPLICATIONS

This application is a National Stage of International patent application PCT/EP2021/085448, filed on Dec. 13, 2021, which claims priority to foreign French patent application No. FR 2013220, filed on Dec. 15, 2020, the disclosures of which are incorporated by reference in their entireties.

FIELD OF THE INVENTION

The invention relates to the field of photoacoustics and more precisely to measurement of the power and wavelength of laser radiation via photoacoustics.

BACKGROUND

The present invention relates to laser spectroscopy methods in which it is necessary to know or precisely control the power and the wavelength of the lasers used.

Among these techniques, photoacoustic spectroscopy (PA) is a method well known to those skilled in the art. This qualitative and quantitative analysis technique allows the composition of various solids, liquids and gases to be determined. This technique is based on interaction of laser radiation with a material, said interaction generating an acoustic wave that is then analyzed in order to characterize the studied material. It is particularly suitable for detecting gases using monochromatic sources, on account of the natural selectivity of the line absorption spectrum of gas atoms. The rapid development of compact infrared laser sources over the last decade (laser diodes for example) has transformed gas detection via PA into a robust, compact and simple solution. PA-based gas analysis requires an amplitude- and/or wavelength-modulated pulsed or continuous-wave laser source, a cell forming an acoustic resonator containing the gas to be analyzed and a detecting microphone. In gas detection the PA effect may be separated into 4 stages: (1) the laser radiation is absorbed by the gas thus exciting rotational, electronic and vibrational energy levels; (2) in the case of ro-vibrational excitations, the gas will preferentially de-excite via molecular collisions that will result in a transfer of rotational/vibrational energy and kinetic energy creating localized heating of the gas. Radiative emission is not predominant in the case of ro-vibrational excitations because of the long lifetime of ro-vibrational radiative levels compared to non-radiative ones at the pressures usually used in PA (~1 bar). In practice, the energy absorbed by the gas is completely converted into heat via transfer of kinetic energy to the gas atoms; (3) generation of an acoustic wave and of a thermal wave caused by the expansion due to the heating of the gas; (4) detection by the microphone of the acoustic signal. The amplitude of vibration of the microphone is representative of the concentration of the gas and the wavelength of laser radiation absorbed by the gas indicates its composition.

In the vast majority of cases, when a gas is being analyzed, the PA signal produced by the interaction between the laser and the studied gas is, before detection, amplified using an acoustic cell presenting a resonance at a certain frequency. Of course, this requires the PA signal to be generated at the same frequency as the resonant frequency of the cell. One resonant cell known in the prior art is, for example, a cell of dual-Helmholtz-resonator type, comprising two first cavities linked to the detection microphone.

To the ends of amplification, it is known to modulate the amplitude of the laser radiation at the resonant frequency of the cell, this causing a modulation of the PA signal at the same frequency. Amplitude modulation of laser radiation takes many forms, but the associated techniques may be divided into two categories: continuous-wave photoacoustics and pulsed photoacoustics.

Pulsed photoacoustics uses pulsed optical sources or continuous-wave sources with an external mechanical or electro-optical modulator. In order to generate a PA signal at the resonant frequency of the cell, it is known to use sources operating in quasi-continuous-wave (QCW) regime. In this case, the amplitude of the laser is modulated at a frequency, referred to as the repetition rate, much higher than that of the resonance of the cell, and hence the laser radiation appears to be continuous from the point of view of the modulation frequency corresponding to the acoustic resonance.

In photoacoustics, it is also known to modulate the wavelength of the laser radiation as shown by J. Saarela et al, "Wavelength modulation waveforms in laser photoacoustic spectroscopy", Appl. Opt. 48, 743-747 (2009). In this case, the laser wavelength is modulated about an absorption peak of the studied gas. Modulation of the laser wavelength makes it possible, in theory, to prevent noise due to interaction between the laser radiation and the walls of the cell from interfering with determination of the concentration of the studied gas.

One of the drawbacks of laser spectroscopy techniques is that obtainment of precise gas measurements requires perfect knowledge of the laser wavelength and of the variation in its power over time. Specifically, an error in the wavelength may for example lead to an error in the estimation of the concentration of the gas to be detected. Often, such instruments incorporate a power detector, this complicating assembly and increasing the cost of the device. To determine wavelength, scanning methods may be employed, but they may prove to be less efficient when measuring gas concentrations close to the sensitivity limit of the instrument. In any case, the characteristics of the lasers may vary over time very slightly, but enough to require adjustment of the instrument that detects the gas.

SUMMARY OF THE INVENTION

The invention aims to mitigate some of the aforementioned problems of the prior art. More precisely, the invention relates to a device allowing the wavelength and power of laser radiation to be determined or controlled via photoacoustics using a simple and inexpensive assembly.

To this end, one subject of the invention is a device for measuring laser radiation via the photoacoustic effect, comprising:

- a cell containing at least one gas having an absorption line with a central wavelength $\lambda_c$,
- an electro-acoustic transducer arranged within the cell and suitable for generating an electrical signal representative of the photoacoustic signal in the cell,
- means for processing the electrical signal generated by the electro-acoustic transducer, in which processing means an estimate of the concentration of the one or more gases is stored,
- at least one laser source suitable for emitting, into the cell, laser radiation at a wavelength suitable for exciting at least one gas contained in the cell, said laser radiation having a wavelength that is variable in an oscillatory manner about an average wavelength $\lambda_{moy}$ at a modulation frequency or an optical power that is variable in an oscillatory manner about an average power at said modulation frequency, such that an interaction between the laser radiation and at least one gas contained in the cell induces generation of a photoacoustic signal at a detection frequency of the electro-acoustic transducer, said cell being sealed by a membrane so as to be impermeable to the one or more gases contained in the cell and having an optical aperture transparent to the laser radiation, said processing means being suitable for determining the wavelength of the laser radiation from the photoacoustic signal.

According to particular embodiments of the invention:

the one or more laser sources are further configured so that said average wavelength varies over time and so that an excursion in average wavelength includes said central wavelength, said processing means further being suitable for determining:

a variation in the phase D(t) of the photoacoustic signal over time based on said electrical signal, the wavelength of the laser radiation based on a variation over time in said phase of the photoacoustic signal;

said processing means further being suitable for determining a power $P_L$ of the laser radiation, based on the electrical signal and on said estimate;

the cell contains a plurality of distinct gases, each having at least one absorption line spectrally distinct from the others, said device further comprising a plurality of laser sources each located outside the cell and suitable for exciting one associated gas;

the processing means are configured to determine a phase $\Phi_{AS}$, referred to as the servo phase, for servo-controlling the obtained photoacoustic signal to a wavelength $\lambda_{AS}$, referred to as the servo wavelength, of the one or more laser sources;

the one or more laser sources comprise electrically pumped lasers, said device comprising a power-supply circuit that generates a pulsed electrical current, referred to as the generation current, that pumps the one or more laser sources, in order to make the one or more laser sources operate in pulsed mode, the processing means being connected to the power-supply circuit, said power-supply circuit being configured to further generate a current, referred to as the base current, that has non-zero values between laser pulses, and that has an amplitude lower than the amplitude of the generation current during the laser pulses, the base current being amplitude modulated in order to generate said oscillatory variation in the wavelength;

the power-supply circuit is configured so that the base current is amplitude modulated so as to servo-control the phase of the photoacoustic signal to said servo phase;

the device comprises a device for controlling a temperature of an active region of the one or more laser sources, said device for controlling temperature being connected to the processing means and being configured to adjust the temperature of the active region of the one or more laser sources so as to servo-control the phase of the photoacoustic signal to said servo phase;

the device for controlling temperature is a resistor, a thermo-electric system or said power-supply circuit;

the concentration of the one or more gases is higher than 1 ppm, and preferably higher than 100 ppm;

the transducer is a microphone comprising a package that is impermeable to the one or more gases, in which is comprised a diaphragm suitable for detecting the photoacoustic signal, the cell being formed by said package.

Another subject of the invention is a photoacoustic system, comprising:

a measuring device according to the invention, a photoacoustic gas-detecting device having a laser entrance face, said device being configured so that a first portion of the laser radiation emitted by at least one laser source illuminates said entrance face of the photoacoustic gas-detecting system.

According to particular embodiments of this system, said cell comprises a laser exit face, the at least one laser source and said photoacoustic gas-detecting device being arranged so that said first portion corresponds to the laser radiation passing through said laser exit face or it comprises an optical component suitable for splitting said laser radiation into said first portion directed toward said laser entrance face of said photoacoustic system and a second portion directed into said cell.

Another subject of the invention is a method for determining the wavelength and power of laser radiation via the photoacoustic effect, comprising the following steps:

generating, in a cell C containing at least one gas having an absorption line with a central wavelength $\lambda_c$, laser radiation at a wavelength suitable for exciting at least one gas contained in the cell, said laser radiation having a wavelength that varies in an oscillatory manner about an average wavelength $\lambda_{moy}$ at a modulation frequency such that an interaction between the laser radiation and at least one gas contained in the cell induces generation of a photoacoustic signal, an average wavelength excursion of the laser radiation including said central wavelength, said average wavelength varying over time, said cell being sealed by a membrane so as to be impermeable to the one or more gases contained in the cell;

detecting said photoacoustic signal and generating an electrical signal (Si) representative of the photoacoustic signal in the cell;

determining a variation over time in the phase D(t) of the photoacoustic signal based on said photoacoustic signal, measuring the wavelength of the radiation based on a variation over time in said phase of the photoacoustic signal, and measuring a power $P_L$ of the laser radiation, based on the electrical signal and on an estimate of the concentration of the one or more gases.

According to one particular embodiment of the method of the invention, the wavelength is measured based on computation of a maximum of a derivative of said variation in the phase of the photoacoustic signal.

BRIEF DESCRIPTION OF THE DRAWINGS

Other features, details and advantages of the invention will become apparent on reading the description given with reference to the appended drawings, which are given by way of example and which show, respectively.

References in the figures, when they are identical, correspond to the same elements.

In the figures, unless otherwise indicated, elements have not been shown to scale.

DETAILED DESCRIPTION

Figure 1:
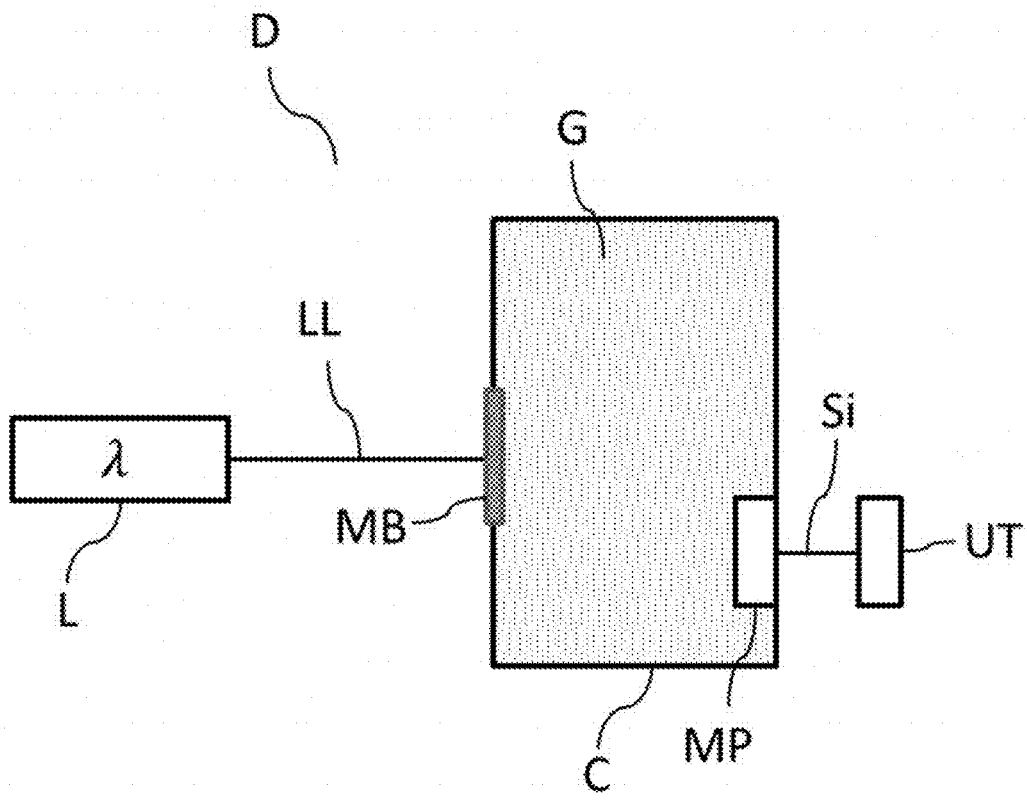
FIG. 1, a schematic view of a device for measuring the power and wavelength of laser radiation LL via the photoacoustic effect according to the invention.

FIG. 1 schematically shows a device D for measuring the power and wavelength of laser radiation LL via the photoacoustic effect according to the invention. The device D comprises a cell C containing at least one gas G that has an absorption line with a central wavelength $\lambda_c$. In addition, the device comprises at least one laser source L suitable for emitting, into the cell C, laser radiation LL at a wavelength suitable for exciting the gas contained in the cell.

The device D also comprises an electro-acoustic transducer MP arranged within the cell and suitable for generating a signal Si representative of the photoacoustic signal generated in the cell. The transducer allows the amplitude of the acoustic waves and thus the power of the laser radiation to be determined, the concentration of the studied gas species being known (see below). This transducer may for example be a microphone or even a tuning fork. In another embodiment, it may be an acousto-optic-electric transducer.

In a manner known per se, the laser source is configured so that the laser radiation LL has a wavelength that varies in an oscillatory manner about an average wavelength $\lambda_{moy}$ at a modulation frequency $f_1$, such that an interaction between the laser radiation and the gas contained in the cell induces generation of a photoacoustic (PA) signal at a detection frequency of the electro-acoustic transducer (first condition).

In addition, the laser source L according to the invention is configured so that the average wavelength $\lambda_{moy}(t)$ varies over time with a period $T_e$, and in such a way that the average-wavelength excursion includes the central wavelength $\lambda_c$ (second condition). This therefore means that the average wavelength varies with a period $T_e$ and takes a plurality of distinct values such that there is a first plurality of values such that $\lambda_{moy}(t)<\lambda_c$ and a second plurality of values such that $\lambda_{moy}(t)>\lambda_c$.

Concretely, the wavelength emitted by the laser source L under the above two conditions may be expressed in the following form: $\lambda(t)=\lambda_{moy}(t)+\lambda_{PA}(t)$ with $\lambda_{moy}(t)$ a function that corresponds to the average value of the wavelength of the radiation and $\lambda_{PA}$ a function that represents the oscillatory part of the wavelength at the frequency $f_1$, the average value of which is equal to 0, and which allows the PA signal to be generated in the cell. The function $\lambda_{moy}$ is for example a ramp function and the function $\lambda_{PA}$ is for example a triangle-wave or square-wave or sinusoidal function. As will be described below, meeting both these conditions makes it possible to accurately determine the wavelength of the radiation based on the phase of the PA signal. These waveforms are given by way of non-limiting example, and any other waveform known to those skilled in the art and allowing the aforementioned conditions in respect of wavelength to be met may be used.

According to another embodiment, the laser source is configured so that the laser radiation LL has an optical power that varies in an oscillatory manner about an average power at a modulation frequency $f_1$, such that an interaction between the laser radiation and the gas contained in the cell induces generation of a photoacoustic signal at a detection frequency of the electro-acoustic transducer. In this embodiment, the laser source is then configured so that the emitted wavelength simply takes the following form: $\lambda(t)=\lambda_{PA}(t)$.

Notably, in all the embodiments of the invention, the cell C is sealed by a membrane MB so as to be impermeable to the gas contained in the cell. This membrane MB has an optical aperture that is transparent to the laser radiation emitted by the one or more laser sources L. By transparent, what is meant here is that the transmittance of the membrane is sufficient for the signal-to-noise ratio of the signal Si generated by the transducer MP to be higher than 1. This membrane is a transparent wall that either does not alter, or alters in a negligible way, the geometrical properties of the beam as it propagates. In contrast to prior-art photoacoustic gas-detecting devices, the device comprises the membrane MB sealing the cavity in order to ensure the presence of the one or more known gases and to allow the device to operate as a photoacoustic sensor. Thus, the concentration of the various gases in the cell is set and known and it is possible to determine the power of the radiation by virtue of the amplitude of the PA signal once the wavelength has been determined with precision (see below).

The device D further comprises means UT for processing the electrical signal Si generated by the transducer MP. The processing means are suitable for determining a measurement of the wavelength of the radiation LL generating the PA signal. To do this, the processing means are configured to determine a variation in the PA signal over time over one period $T_e$ of variation in the average wavelength. Based on this variation, the means UT are configured to determine a variation in the phase $\Phi(t)$ of the PA signal represented by the signal Si(t). For example, the phase $\Phi(t)$ may be computed in the following manner (equation 1):

$$\Phi(t) = \arctan\left[\frac{\mathrm{Im}\,(G(\mathrm{Si}(t)))}{\mathrm{Re}\,(G(\mathrm{Si}(t)))}\right] - 2\pi t/T \,[2\pi]$$

with $T=1/f_1$ and $$G(S(t)) = 1/\sqrt{2\pi} \int_{t-\frac{T}{2}}^{t+\frac{T}{2}} \mathrm{Si}(t')e^{i2\pi f t'}\,dt'$$

the Gabor transform of the PA signal Si(t).

Alternatively, the means UT for processing the electrical signal Si generated by the transducer MP comprise a synchronous detector suitable for simultaneously generating the PA signal and a signal representative of the variation in the phase of the PA signal.

According to one embodiment, the processing means are then configured to compute the derivative of the variation in the phase $\Phi(t)$ over the period $T_e$ and to determine the maximum of the derivative over this period of time. As known per se, this maximum is reached at a wavelength equal to the central wavelength $\lambda_c$ of the absorption peak of the gas. Thus, determining the maximum of the derivative of the variation in the phase allows the time at which the value of the wavelength of the laser radiation is such that $\lambda=\lambda_c$ to be accurately determined. In the case of an electrically pumped laser source, it is then possible to determine a value of the supply current allowing laser radiation to be generated at this wavelength $\lambda=\lambda_c$. In what follows, this value of the supply current will be used to servo-control the laser to this wavelength (see below).

In addition, after the time at which $\lambda=\lambda_c$ has been determined, by comparing the known variation in the wavelength $\lambda(t)$ over time and the measured variation in the phase $\Phi(t)$ of the PA signal, a phase of the PA signal is associated with a wavelength $\lambda(t)$ of the laser radiation at a time t. Thus, subsequent measurement of the phase $\Phi(t)$ of the PA signal allows instantaneous determination of the wavelength of the corresponding laser radiation.

In what follows, a wavelength $\lambda_4$, referred to as the servo wavelength, corresponding to a phase $\Phi_{AS}$, referred to as the servo phase, is chosen by the processing means.

This wavelength measurement is typically accurate to within 0.01 cm$^{-1}$ for an absorption peak of width 0.15 cm$^{-1}$ and for a signal-to-noise ratio of the PA signal detected by the transducer MP of 100. These values are given by way of non-limiting example. This measurement accuracy mainly depends on the gas concentration in the sealed cavity, on the laser power input into the cavity, and on the performance of the cavity (quality factor and noise).

According to one embodiment, the sequence of variation in wavelength is repeated a plurality of times so that the processing means are able to take an average of the variations in the PA signal obtained in each repetition. This allows a more robust averaged PA signal to be obtained and thus the signal-to-noise ratio to be improved and therefore the accuracy of the wavelength measurement to be improved.

Importantly, in the device D of the invention, the concentration C(i) of the various gas species G(i) is known and stored in the means UT. For a laser length $\lambda_{AS}=\lambda_c$ at the time $t_{AS}$, the power $P_L$ of the laser radiation is computed based on the maximum $Si_{max}$ of the amplitude of the signal Si representative of the PA signal and on the concentration C of the gas from which the PA signal is generated.

The following is obtained:

$$P_L=A\times C\times Si_{max},$$

with A a conversion factor that is determined by prior calibration of the instrument.

For a laser length $\lambda_{AS}\neq\lambda_c$, the laser power $P_L$ is deduced based on the $Si_{max}$ of the amplitude of the signal Si representative of the PA signal and on a coefficient K relating to the position of the length $\lambda_{AS}$ with respect to the wavelength $\lambda_c$ and on the shape of the absorption peak.

The following is obtained:

$$P_L=A\times K\times C\times Si_{max}$$

It is therefore the exact determination of the wavelength and the fact that the cell C is sealed with a known gas concentration that allows the power of the corresponding laser radiation to be determined. The device D according to the invention is therefore a low-cost photoacoustic sensor that is an alternative to the power sensor and to the other wavelength-determining techniques of the prior art.

Preferably, the concentration of the one or more gases G in the cell is higher than 1 ppm. This is necessary to obtain a PA signal sufficient to allow a sufficiently accurate determination of the wavelength and of the power $P_L$. Preferably, the concentration of the one or more gases in the cell is higher than 100 ppm in order to be able to measure the slight variations in the wavelength of the laser radiation LL.

According to one embodiment of the invention, the cell C contains a plurality of distinct gases, each having at least one absorption line spectrally distinct from the others, and the device comprises a plurality of monochromatic laser sources each located outside the cell and suitable for irradiating the cell and thus exciting one associated gas. In this embodiment, the device therefore makes it possible to measure power and wavelength for a plurality of laser sources. In the remainder of the description, for the sake of brevity, mention will only be made of one laser source and of a single gas in the cell. It will be understood that this is merely one single example and that all the embodiments of the device according to the invention also apply to the case where the device comprises a plurality of laser sources and of gases in the cell C. Alternatively, the laser source is suitable for emitting a frequency comb, each of the frequencies of this comb being suitable for irradiating the cell and for exciting one associated gas.

Figure 2:
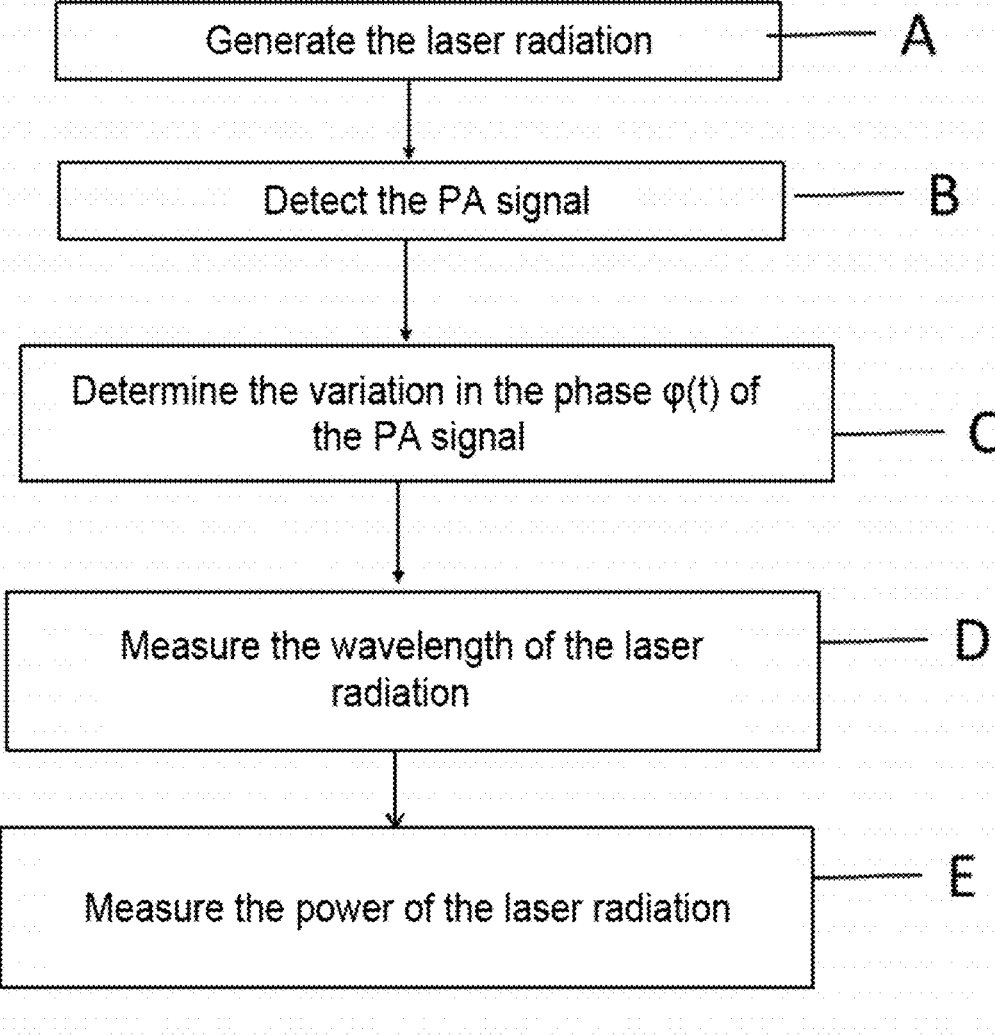
FIG. 2, a schematic view of a method for determining the wavelength and power of laser radiation via the photoacoustic effect according to the invention.

FIG. 2 illustrates a method of the invention suitable for determining the wavelength and power of laser radiation via the photoacoustic effect. This method is implemented by the device of FIGS. 1 and 3-6.

This method comprises a first step A that is implemented by the one or more laser sources L, and that consists in generating, in the cell C, laser radiation LL at a wavelength suitable for exciting at least one gas contained in the cell C. As explained above, the generated laser radiation LL has a wavelength $\lambda(t)$ that is variable in an oscillatory manner about an average wavelength $\lambda_{moy}$ at a modulation frequency $f_1$, such that an interaction between the laser radiation and at least one gas contained in the cell induces generation of the photoacoustic signal at a detection frequency of the electroacoustic transducer MP. In addition, the generated radiation has an average laser-radiation wavelength excursion including the central wavelength of the absorption line of the gas in the cell and the average wavelength varies over time with a period $T_e$. It is necessary for the wavelength excursion to include the central wavelength $\lambda_c$ for the wavelength of the radiation to scan the absorption line and for it to be possible to thus correctly calibrate the wavelength by associating the maximum of the PA signal with the central wavelength of the absorption line.

The method of FIG. 2 comprises a step B, after step A, of detecting, by means of the electro-acoustic transducer, the PA signal generated in the cell. Step B comprises a step of generating the signal Si representative of the photoacoustic signal in the cell.

After step B, the method comprises a step C of determining a variation over time in the phase $\Phi(t)$ of the photoacoustic signal based on the detected photoacoustic signal, throughout the period $T_e$. As seen above, the phase may be determined via a preliminary step of computing the Gabor transform of the PA signal at the modulation frequency $f_1$ and with equation 1. Alternatively, this phase measurement is carried out by means of a synchronous detector suitable for simultaneously generating the PA signal and a signal representative of the variation in the phase of the PA signal. According to another alternative, the phase $\Phi(t)$ is determined by the processing means UT based on the signal generated by the transducer MP using any method known to those skilled in the art.

After step C, the method comprises a step D of determining the wavelength of the radiation based on the variation over time in the phase of the photoacoustic signal over the period $T_e$. As explained above, this is done by computing the maximum of the derivative of the variation in the phase of the photoacoustic signal over the period $T_e$, this maximum being obtained for a radiation wavelength equal to the central wavelength $\lambda_c$.

Lastly, the method of FIG. 2 comprises a final step E of determining the power $P_L$ of the laser radiation based on the photoacoustic signal and on an estimate of the concentration of the gas. Specifically, since the concentration of the gas in the cell is known, the processing means are configured to compute the power $P_L$ of the obtained laser radiation for a wavelength equal to the central wavelength $\lambda_c$ using the equation $P_L=A\times C\times S_{max}$.

Steps C, D and E are implemented by the processing means UT.

The method of FIG. 2 therefore allows the wavelength and then the laser power $P_L$ of the laser radiation generating the PA signal to be accurately determined.

Figure 3:
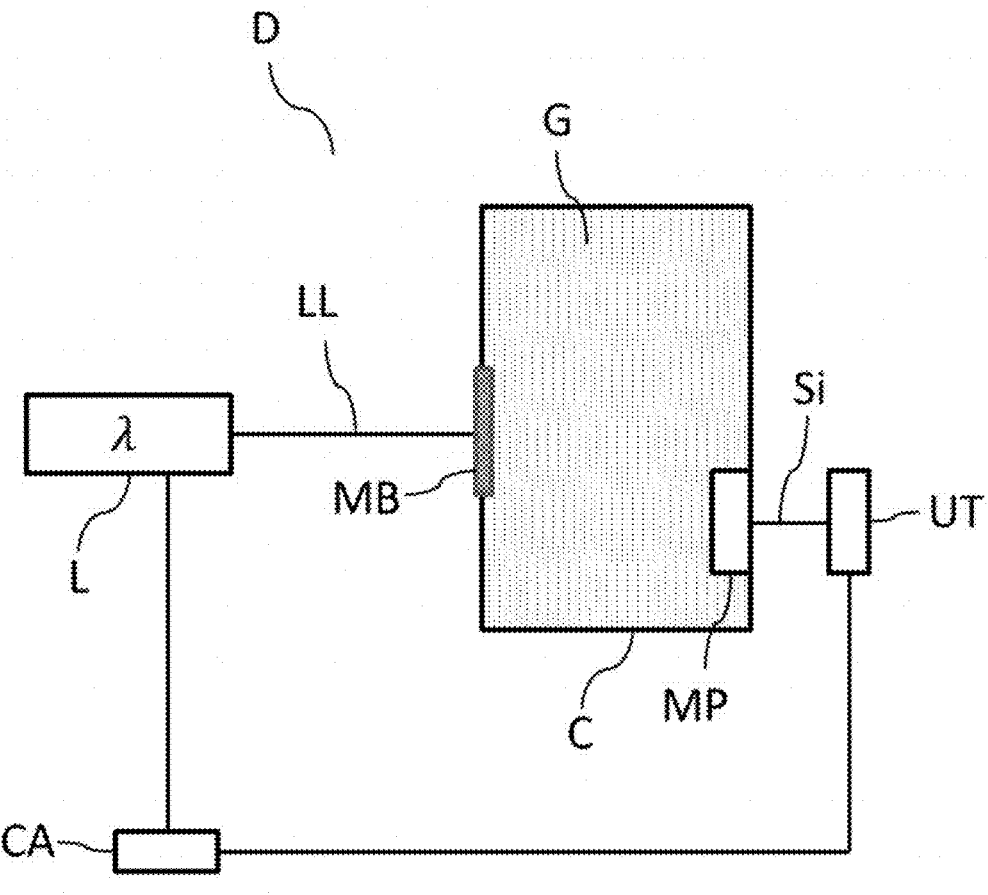
FIG. 3, a schematic view of a device according to a first embodiment of the invention.

FIG. 3 shows a device according to a first embodiment of the invention, in which embodiment the one or more laser sources are sources that are electrically pumped by a power-supply circuit CA. For example, the laser source is a quantum cascade laser or even laser diodes. This power-supply circuit is connected to the processing means UT and generates a pulsed electric current, referred to as the generation current, that pumps the laser source in order to make the one or more laser sources operate in pulsed mode.

The laser source is powered by a power-supply circuit CA that applies, to the laser source L, repeatedly with a period $T_e$, a generation current of the following form: $I(t)=I_0+g\cdot t+h\cdot\sin(2\pi f_1 t)$, with $0\leq t\leq T_e$ and with $I_0$ the offset of the current, g the slope of the current and h the amplitude of the modulation current. This waveform is given by way of non-limiting example, and any other waveform known to those skilled in the art and allowing the aforementioned conditions in respect of wavelength to be met may be used (see for example J. Saarela et al, "Wavelength modulation waveforms in laser photoacoustic spectroscopy", Appl. Opt. 48, 743-747 (2009)).

Moreover, in a manner known per se, the power-supply circuit CA is configured to also generate, in addition to applying the generation current, a current, referred to as the base current, that takes non-zero values between laser pulses and that has an amplitude lower than the amplitude of the generation current during the laser pulses. This base current is amplitude modulated in order to generate the oscillatory variation in the wavelength and therefore to generate the PA signal.

Alternatively, according to another embodiment, it is the base current and not the generation current that carries the waveform repeated with the period $T_e$. Thus, for example, the base current carries the aforementioned waveform $g\cdot t+h\cdot\sin(2\pi f_1 t)$, with $0\leq t\leq T_e$ and the generation current is simply of the form $I(t)=I_0$.

In the device of FIG. 3, according to a first variant, the power-supply circuit is further controlled by the processing means and configured so that the base current is amplitude modulated so as to servo-control the wavelength of the laser radiation LL to the central wavelength $\lambda_c$. This servo-control is achieved via the variation in the phase of the PA signal, which forms an error signal. Specifically, the phase has a high slope (maximum derivative) and a linear behavior about the central wavelength $\lambda_c$, i.e. ideal characteristics for a servo error signal. The processing means controlling the power-supply circuit are therefore configured so that the circuit CA injects a value of the generation current allowing the wavelength $\lambda_c$ to be obtained.

The servo-control is carried out by the processing means, via feedback electronics, using conventional servo-control methods and for example, non-limitingly, using PI or PID feedback electronics (PID standing for Proportional Integral Derivative, these terms alluding to the three modes of action on the error signal of the feedback electronics). This type of feedback allowing the error signal to be made to converge on a set value is well known in the art of automatic control.

According to a second variant, the processing means are configured to servo-control a selected servo-control wavelength $\lambda_{AS}*\lambda_c$. The processing means are then configured to servo-control the power-supply circuit CA or the control device Temp (see FIG. 4) so as to keep the phase of the photoacoustic signal at the servo phase and therefore to keep the wavelength of the laser source at the servo wavelength.

Advantageously, the processing means are suitable for adjusting the servo phase $\Phi_{AS}$ over time when the latter drifts (this drift possibly being caused by many experimental parameters) so that the wavelength is always servo-controlled to the wavelength $\lambda_{AS}$.

Figure 4:
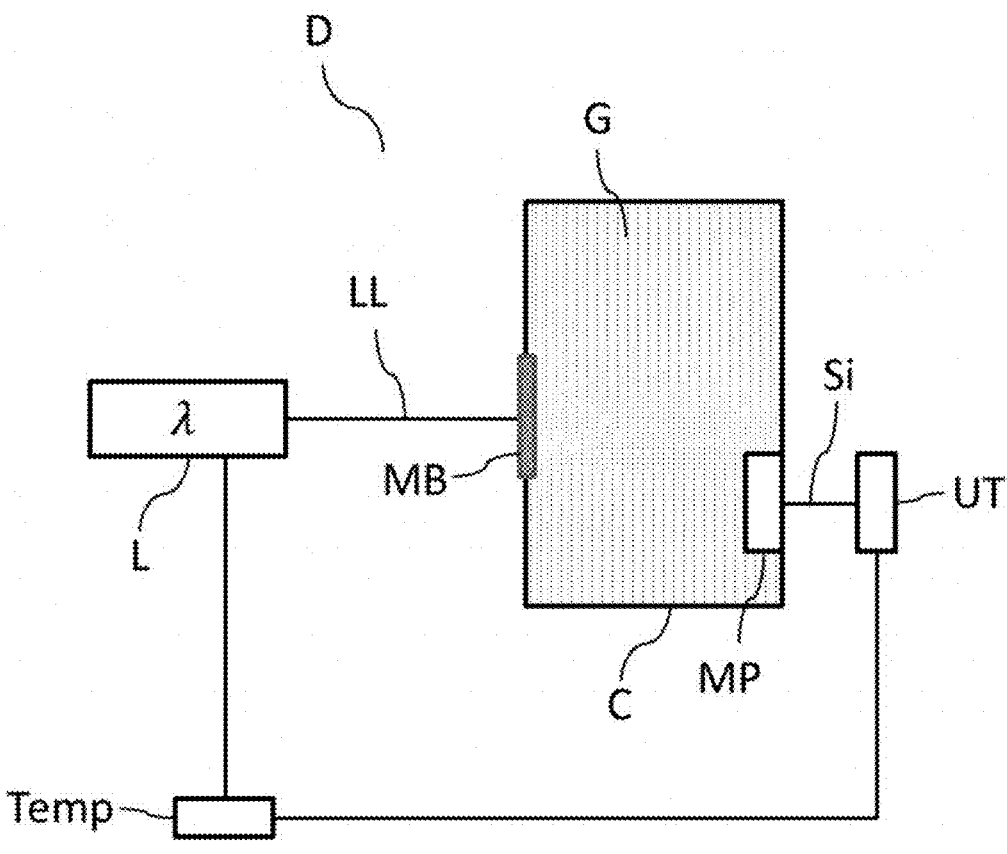
FIG. 4, a schematic view of a device according to a second embodiment of the invention.

FIG. 4 schematically shows a second embodiment of the invention that is identical to the embodiment of FIG. 3, with the exception that, here, the servo-control is carried out by the processing means using a device Temp for controlling the temperature of the active region of the laser L. Specifically, in a manner known per se, in an electrically pumped laser, when the current applied to the laser is higher than the injection threshold, the wavelength emitted by the laser L may be expressed as follows:

$$\lambda(I,T)=\lambda_0+\alpha T+bI$$

with $\lambda_0$ the theoretical length of the laser at 0 K and under 0 mA of current, a the temperature coefficient of the wavelength, b the current coefficient of the wavelength, T the temperature of the laser and I the current applied to the laser.

Controlling the temperature T of the active region by way of the processing means UT therefore allows the laser to be servo-controlled by keeping the phase of the photoacoustic signal at the servo phase $\Phi_{AS}$ and therefore keeping the wavelength of the laser source at the servo wavelength $\lambda_{AS}$.

According to one embodiment, the control device Temp is a resistor attached to or placed close to the active region so as to be able to control its temperature. Alternatively, according to another embodiment, the device Temp is a thermo-electric system comprising the laser L and allowing the temperature T of the active region to be precisely regulated.

Alternatively, according to a third embodiment, the device for controlling temperature is the power-supply circuit CA of the laser L. Specifically, a higher injection current will heat the active region and will therefore modify the emitted wavelength. It is therefore possible to servo-control the laser by controlling the temperature of the active region through the power-supply circuit.

Figure 5:
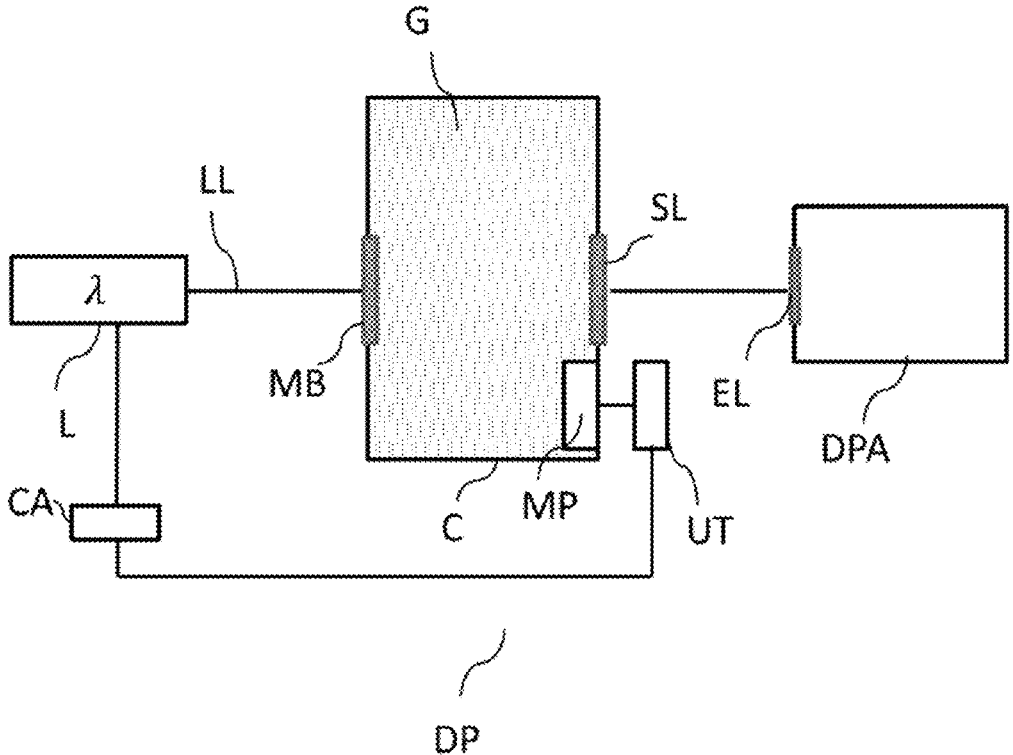
FIG. 5, a schematic view of a photoacoustic detecting system comprising the device D according to the invention.

One application of the device according to the invention is to allow control of laser wavelength and power in combination with a photoacoustic gas-detecting device. Thus, FIG. 5 schematically illustrates a photoacoustic detecting system DP, comprising the device D according to the invention which is suitable for measuring the wavelength and power of laser radiation via photoacoustics. In addition, the system DP comprises a conventional photoacoustic gas-detecting device DPA with a laser entrance face EL. The device DPA is a conventional photoacoustic gas-detecting device. In the embodiment of FIG. 5, the device D comprises an optical window called the laser exit face FL, which is passed through by a first portion of the laser radiation emitted by the source L into the cell. The device DPA is arranged so that this first portion passes through the face EL and allows gas detection to occur. It is the fact that the cell C is sealed that allows the presence of the known gas in this cell to be ensured and that allows the device D to operate as a photoacoustic sensor. The device D is therefore a sensor that is easily integrable into a photoacoustic assembly and that allows the power and wavelength of the laser radiation to be measured. The device D in addition allows the laser wavelength to be precisely servo-controlled to a target value $\lambda_{AS}$ in order to avoid any drift prejudicial to gas detection by the device DPA.

Figure 6:
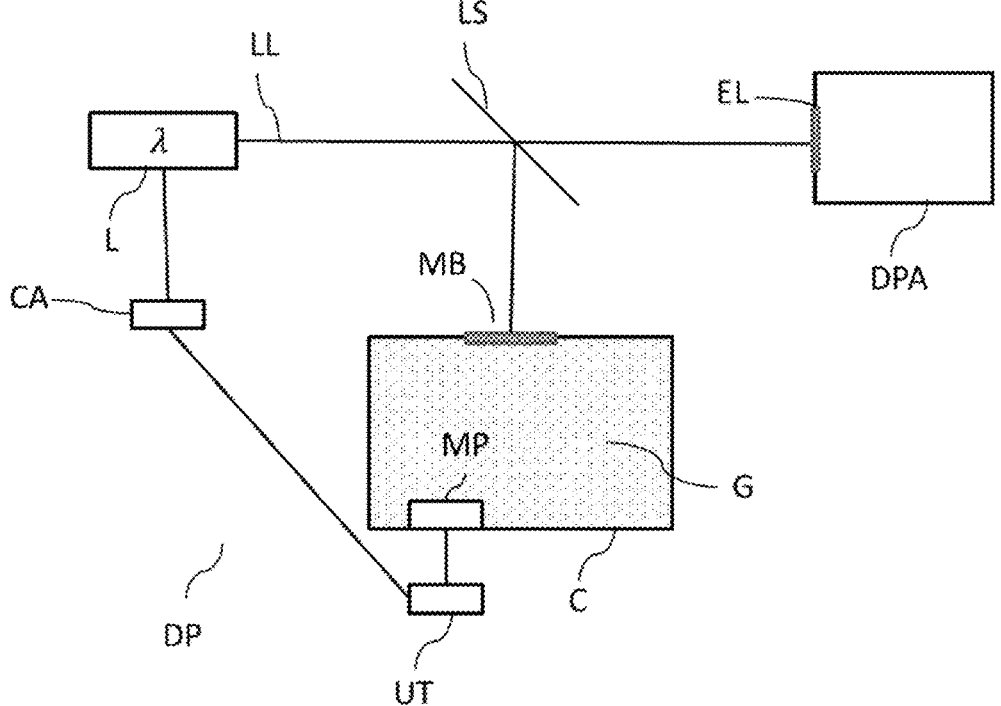
FIG. 6, a schematic view of a photoacoustic detecting system according to one alternative of the invention.

FIG. 6 is an alternative to the embodiment of FIG. 5 in which a beam splitter LS splits the radiation emitted by the source L, into a first laser-radiation portion emitted by the source L toward the laser entrance face EL and into the DPA device, and into a second portion directed into the cell C. With respect to the embodiment of FIG. 5, this embodiment has the advantage of not degrading the optical properties of the laser beam directed toward the device DPA and of reducing constraints on the architecture of the components.

In another alternative to the embodiment of FIG. 5, the device DPA comprises a laser exit face and the device D is arranged so that radiation transmitted by the laser exit face of the device DPA enters into the cell C. This embodiment has the advantage of taking into account possible additional degradations of the laser power that could occur in the gas cell of the device DPA, such as an obstruction of the laser entry face. According to another embodiment, wavelength is measured and servo-control based on the PA signal detected by the transducer MP is carried out using any method known to those skilled in the art.

In the invention, the transducer MP is a microphone, for example a MEMS microphone (MEMS standing for Micro-ElectroMechanical System) or ECM microphone (ECM standing for Electret Condenser Microphone). The microphone comprises an external protective package (or cavity) that comprises an acoustic entry zone suitable for letting the acoustic waves penetrate into the package in order to be detected by a diaphragm DP (for example a MEMS or ECM diaphragm). In the invention, the package surrounding the microphone MP forms the cell C and is impermeable to gas. The membrane MB that seals the cell C so as to make it impermeable to the one or more gases contained in the cell thus forms the acoustic entry zone. This feature allows the compactness of the device to be improved, without causing too great a degradation in performance. Thus, critically, in the invention, the cell C is therefore not a resonant acoustic cavity. Specifically, the inventors have observed that, for a concentration of about 1000 ppm H2O and an optical power of 1 mW, it is not necessary to use a resonant acoustic cell to amplify the PA signal. It will be understood that these values are given by way of example and that another gas with another concentration may be used with a comparable optical power. This makes possible use of a cell C of much smaller size than the resonant acoustic cavities typically used in the prior art. By way of non-limiting example, in the preferred embodiment of the invention, the cell C formed by the package of the microphone MP has dimensions smaller than 3 mm by 4 mm by 1.2 mm, and even more preferably smaller than 900 μm by 300 μm by 900 μm. The device of the invention is therefore very compact.

Figure 7:
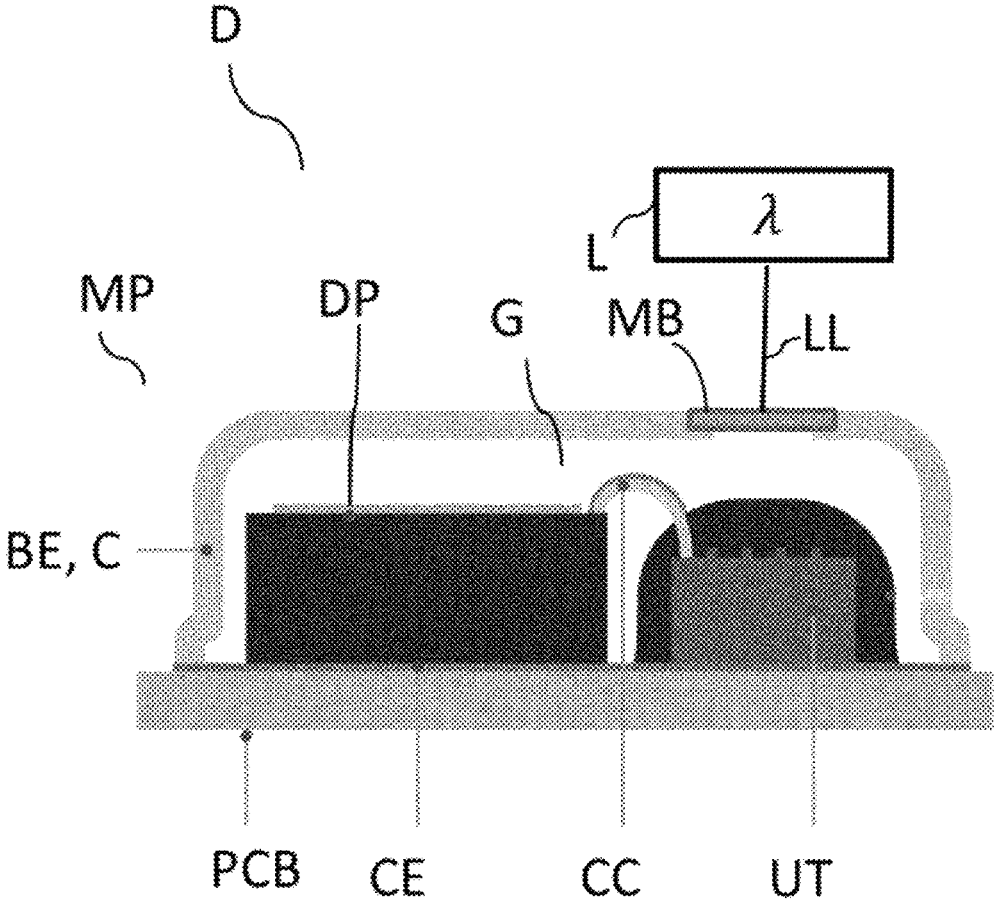
FIG. 7, a schematic view of a photoacoustic detecting system according to one embodiment of the invention.

FIG. 7 schematically illustrates one embodiment in which the microphone MP is a MEMS microphone with a diaphragm DP. The device of FIG. 7 comprises an external package BE for protecting the diaphragm DP. This package BE contains the gas G and is sealed by the membrane MB in order to form the cell C. Furthermore, the device comprises a printed circuit board PCB that comprises the electrical contacts of the microphone and a connecting cable CC connecting the microphone to the processing means UT. The processing means UT is for example an application-specific integrated circuit (ASIC). In addition, the device comprises an optional sealing layer CE, placed on the board PCB in order to ensure the seal-tightness of the cell C. This embodiment is very compact.

Figure 8:
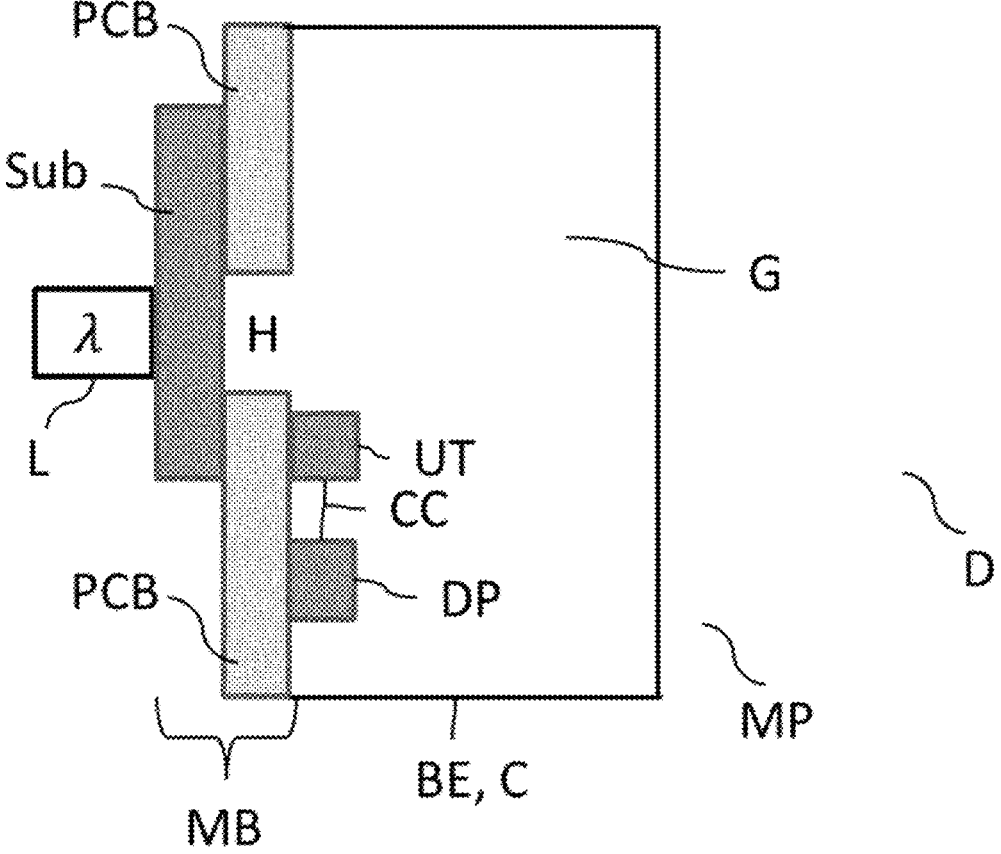
FIG. 8, a schematic view of a photoacoustic detecting system according to another embodiment of the invention.

FIG. 8 illustrates one preferred embodiment of the invention. In this embodiment, the membrane MB for sealing the cavity C is formed by an assembly comprising a substrate Sub that is transparent to the laser radiation LL, deposited on the printed circuit board PCB. The printed circuit board PCB comprises the electrical contacts of the microphone MP, which is connected to the processing means UT by the connecting cable CC. In addition, the board PCB has a gap H allowing the radiation LL to be transmitted into the cavity C in order to allow the photoacoustic signal to be generated. This construction of the membrane makes it possible to obtain a membrane that is seal-tight and capable of redistributing both the electrical contacts of the processing means UT to the microphone and optionally the electrical contacts of the laser L. Specifically, optionally, as illustrated in FIG. 8, the laser L is attached to the substrate Sub in order to increase the compactness of the device.

Preferably, in the embodiment of FIG. 8, the device comprises solder joints between the substrate and the board PCB and between the board PCB and the diaphragm DP in order to ensure the seal-tightness of the cell C. Advantageously, the solder joints between the board PCB and the diaphragm DP may be functionalized in order to produce the electrical contacts of the microphone.

The invention claimed is:

1. A device (D) for measuring laser radiation via the photoacoustic effect, comprising:
   a cell (C) containing at least one gas (G) having an absorption line with a central wavelength $\lambda_c$,
   an electro-acoustic transducer (MP) which is a microphone comprising a diaphragm (DP) and a package (BE) that is impermeable to the one or more gases, the diaphragm being arranged within the cell and being suitable for generating an electrical signal (Si) representative of the photoacoustic signal in the cell, the cell (C) being formed by said package,
   means (UT) for processing the electrical signal generated by the electro-acoustic transducer, in which processing means an estimate of the concentration of the one or more gases is stored,
   at least one laser source (L) suitable for emitting, into the cell, laser radiation (LL) at a wavelength suitable for exciting at least one gas contained in the cell, said laser radiation having a wavelength that varies in an oscillatory manner about an average wavelength $\lambda_{moy}$ at a modulation frequency ($f_1$) or an optical power that varies in an oscillatory manner about an average power at said modulation frequency ($f_1$), such that an interaction between the laser radiation and at least one gas contained in the cell induces generation of a photoacoustic signal at a detection frequency of the electro-acoustic transducer,
   said cell being sealed by a membrane (MB) so as to be impermeable to the one or more gases contained in the cell and having an optical aperture transparent to the laser radiation,

said cell having dimensions smaller than 3 millimeters (mm) by 4 mm by 1.2 mm, said processing means being suitable for determining the wavelength of the laser radiation from the photoacoustic signal.

2. The device as claimed in claim 1, wherein the one or more laser sources are further configured so that said average wavelength varies over time and so that an excursion in average wavelength includes said central wavelength, said processing means further being suitable for determining:

a variation in the phase $\Phi(t)$ of the photoacoustic signal over time based on said electrical signal (Si), the wavelength of the laser radiation based on a variation over time in said phase of the photoacoustic signal.

3. The device as claimed in claim 2, said processing means further being suitable for determining a power $P_L$ of the laser radiation, based on the electrical signal (Si) and on said estimate.

4. The device as claimed in claim 1, wherein the cell contains a plurality of distinct gases, each having at least one absorption line spectrally distinct from the others, said device further comprising a plurality of laser sources each located outside the cell and suitable for exciting one associated gas.

5. The device as claimed in claim 1, wherein the processing means are configured to determine a phase $\Phi_{AS}$, referred to as the servo phase, for servo-controlling the obtained photoacoustic signal to a wavelength $\lambda_{As}$, referred to as the servo wavelength, of the one or more laser sources.

6. The device as claimed in claim 5, wherein the one or more laser sources comprise electrically pumped lasers, said device comprising a power-supply circuit (CA) that generates a pulsed electrical current (CG), referred to as the generation current, that pumps the one or more laser sources, in order to make the one or more laser sources operate in pulsed mode, the processing means being connected to the power-supply circuit, said power-supply circuit being configured to further generate a current (CB), referred to as the base current, that has non-zero values between laser pulses, and that has an amplitude lower than the amplitude of the generation current during the laser pulses, the base current being amplitude modulated in order to generate said oscillatory variation in the wavelength.

7. The device as claimed in claim 6, wherein the power-supply circuit is configured so that the base current is amplitude modulated so as to servo-control the phase of the photoacoustic signal to said servo phase.

8. The device as claimed in claim 6, comprising a device (Temp) for controlling a temperature of an active region of the one or more laser sources, said device for controlling temperature being connected to the processing means and being configured to adjust the temperature of the active region of the one or more laser sources so as to servo-control the phase of the photoacoustic signal to said servo phase.

9. The device as claimed in claim 8, wherein the device for controlling temperature is a resistor, a thermo-electric system or said power-supply circuit.

10. The device as claimed in claim 1, wherein the concentration of the one or more gases is higher than 1 ppm, and preferably higher than 100 ppm.

11. A photoacoustic detecting system (DP), comprising:

a measuring device as claimed in claim 1, a photoacoustic gas-detecting device (DPA) having a laser entrance face (EL), said device being configured so that a first portion of the laser radiation emitted by at least one laser source illuminates said entrance face of the photoacoustic gas-detecting system.

12. The system as claimed in claim 11, wherein said cell comprises a laser exit face (SL), the at least one laser source and said photoacoustic gas-detecting device being arranged so that said first portion corresponds to the laser radiation passing through said laser exit face.

13. The system as claimed in claim 11, comprising an optical component (LS) suitable for splitting said laser radiation into said first portion directed toward said laser entrance face of said photoacoustic system and a second portion directed into said cell.

14. A method for determining the wavelength and power of laser radiation via the photoacoustic effect, comprising the following steps:

A. generating, in a cell C containing at least one gas (G) having an absorption line with a central wavelength $\lambda_c$, laser radiation (LL) at a wavelength suitable for exciting at least one gas contained in the cell, said laser radiation having a wavelength that varies in an oscillatory manner about an average wavelength $\lambda_{moy}$ at a modulation frequency ($f_1$) such that an interaction between the laser radiation and at least one gas contained in the cell induces generation of a photoacoustic signal, an average wavelength excursion of the laser radiation including said central wavelength, said average wavelength varying over time, said cell being sealed by a membrane (MB) so as to be impermeable to the one or more gases contained in the cell, said cell having dimensions smaller than 3 millimeters (mm) by 4 mm by 1.2 mm;

B. detecting said photoacoustic signal with a microphone comprising a diaphragm (DP) and a package (BE) that is impermeable to one or more gases, the diaphragm being arranged within the cell, the cell (C) being formed by said package, said diaphragm being suitable for generating an electrical signal (Si) representative of the photoacoustic signal in the cell;

C. determining a variation over time in the phase $\Phi(t)$ of the photoacoustic signal based on said photoacoustic signal, D. measuring the wavelength of the radiation based on a variation over time in said phase of the photoacoustic signal, and E. measuring a power $P_L$ of the laser radiation, based on the electrical signal and on an estimate of the concentration of the one or more gases.

15. The method as claimed in claim 14, wherein the wavelength is measured based on computation of a maximum of a derivative of said variation in the phase of the photoacoustic signal.

* * * * *